June 16, 1931. W. MILLER 1,810,054
LANDING GEAR FOR AEROPLANES
Filed Jan. 6, 1931
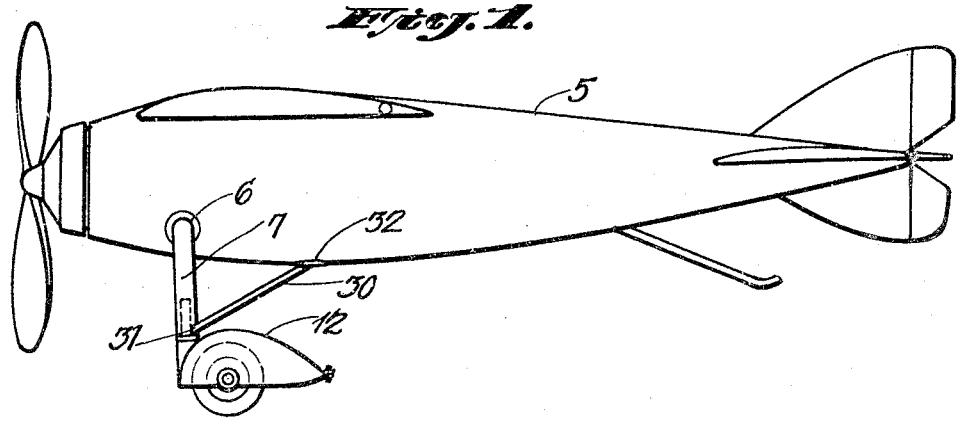
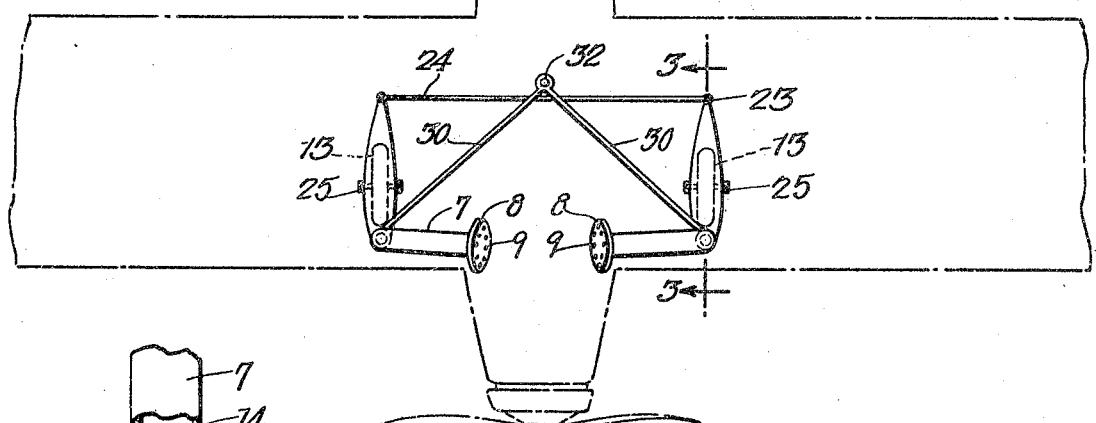
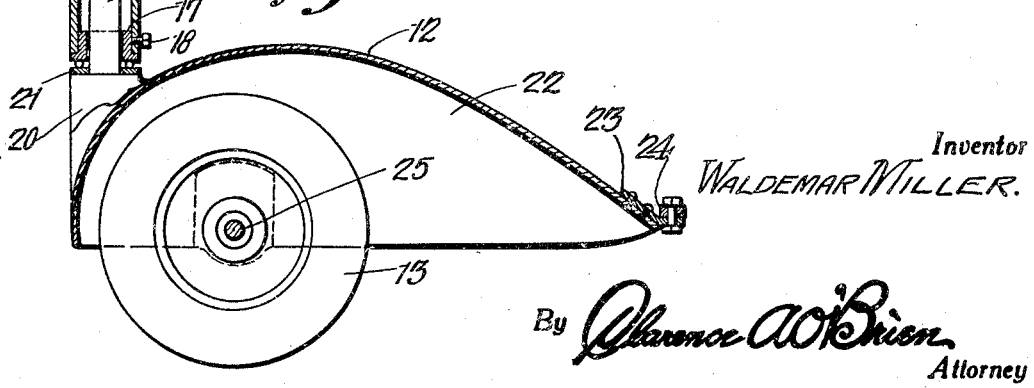
Inventor
WALDEMAR MILLER.
By Clarence A. O'Brien
Attorney Patented June 16, 1931

1,810,054

UNITED STATES PATENT OFFICE

WALDEMAR MILLER, OF NEW YORK, N. Y.

LANDING GEAR FOR AEROPLANES

Application filed January 6, 1931. Serial No. 506,998.

The present invention relates to new and useful improvements in aeroplanes, and more particularly it pertains to a new and novel landing gear therefor.

It is one of the objects of the present invention so to construct a landing gear, that the traction elements thereof, which in the present instance are wheels, may be mounted for swinging movement about a vertical axis common to each wheel.

It is a further object of the invention, so to construct the landing gear that in the case of two wheels, arranged side by side, the wheels are connected so that they operate in unison and will at all times occupy the same relative position with relation to the longitudinal axis of the plane upon which they are mounted.

Other objects of the invention relate to new and novel constructions and combination of parts hereinafter described and illustrated in detail in the accompanying drawings, wherein;

Figure 1, is a view in side elevation illustrating an aeroplane equipped with a landing device constructed in accordance with the present invention, Figure 2, is a top plan view partially diagrammatic illustrating the landing gear and its position with relation to the aeroplane to which it is attached, and;

Figure 3, is a detail vertical sectional view taken on the line 3—3 of Figure 2.

Referring specifically to the drawings, the reference numeral 5 designates the body of an aeroplane, which body is constructed in any desired manner and may have any suitable controlling element essential to the operation thereof.

In carrying out my present invention, I provide two angularly disposed tubular members 7 which are connected to the body 5 of the aeroplane as at 6. This connection of the tubular members 7 with the body of the aeroplane is preferably effected by means of plates or the like 8 secured to the upper ends of the tubular members 7 which plates may be perforated as at 9 for the reception of suitable securing means not herein shown. The lower ends of these tubular members 7 are open and are adapted to receive the vertical standard 10 of a suitable hood like member 12 of which there is one for each wheel, the latter being designated 13. The vertical standard 10 carried by each of the hoods 12 is provided upon its upper end with a head like member 14 which is of a diameter substantially equal or slightly less than the inner diameter of the tubular members 7 in whose open end it is received, and carried by the tubular members 7, there is a bearing or the like 15 in which the vertical standard 10 is mounted. These bearings may be secured in position in the tubular members 7 by means of set screws and collars designated generally at 16. Near the lower end of each tubular member, there is a bearing collar 17 which is secured in position as at 18.

As best illustrated in Figure 3, the standard 10 is connected to the forward portion of its respective hood 12 and a suitable enlargement such as 20 is provided upon the forward end of each hood 12 to provide a bearing seat 21 for the rollers or any friction elements of the bearing 17 heretofore described.

It will be noted by reference to Figure 3 that the hood of each wheel has a rearwardly extending portion 22 and connected to the outer face of the top wall of the rearwardly extending portion 22 as by brackets or the like 23, there is a transversely extending connecting rod 24. This connecting rod 24 connects the wheels 13 in unison which latter are mounted in the hoods as at 25, and causes the wheels to move in unison about their respective vertical axis formed by the standard 10 mounted in the tubular members 7.

If desired, suitable braces such as 30 may be connected in any desired manner as at 31 to the tubular members 7, and as at 32 to the under portion of the body 5 of the aeroplane.

From the foregoing, it will be apparent that the present invention provides a new and novel landing gear for aeroplanes in which two or more landing wheels may be connected together for operation in unison about a vertical axis common to each of the landing wheels.

While the invention has been herein illustrated in what may be termed a preferred form, it is to be understood that the invention is not to be limited to the specific construction herein shown, but that it may be practiced in other forms without departing from the spirit of the invention.

Having thus described the invention, what is claimed as new, and what it is desired to secure by Letters-Patent of the United States, is:

1. In a landing gear for aeroplanes, tubular members depending from the body of the plane, a plurality of landing wheels, a hood partially enclosing each of said wheels, means carried by each hood and projecting into said tubular members for pivotally mounting said hoods and wheels, and means connecting said hoods for causing said wheels to operate in unison.

2. In a landing gear for aeroplanes, a plurality of landing wheels, a hood partially enclosing each of said wheels, means carried by each hood for pivotally mounting the same for movement about a vertical axis, and means connecting said hoods whereby the landing wheels are caused to operate in unison.

In testimony whereof I affix my signature.

WALDEMAR MILLER.